US010484489B2

(12) United States Patent
El-Arini et al.

(10) Patent No.: US 10,484,489 B2
(45) Date of Patent: Nov. 19, 2019

(54) GENERATING A FEED OF CONTENT FOR A USER OF AN ONLINE SYSTEM INCLUDING CONTENT ASSOCIATED WITH ADDITIONAL ONLINE SYSTEM USERS WHO ARE NOT CONNECTED TO THE USER VIA THE ONLINE SYSTEM

(71) Applicant: Facebook, Inc., Menlo Park, CA (US)

(72) Inventors: Khalid Bakry El-Arini, Fremont, CA (US); David Vickrey, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 428 days.

(21) Appl. No.: 15/394,722

(22) Filed: Dec. 29, 2016

(65) Prior Publication Data
US 2018/0191847 A1    Jul. 5, 2018

(51) Int. Cl.
*H04L 29/08* (2006.01)
*H04L 12/58* (2006.01)
*G06Q 50/00* (2012.01)
*G06Q 30/02* (2012.01)

(52) U.S. Cl.
CPC ......... *H04L 67/22* (2013.01); *G06Q 30/0269* (2013.01); *G06Q 50/01* (2013.01); *H04L 51/10* (2013.01); *H04L 51/32* (2013.01)

(58) Field of Classification Search
CPC ..... G06Q 50/01; G06Q 30/0269; H04L 67/22
See application file for complete search history.

(56) References Cited

U.S. PATENT DOCUMENTS

| 8,825,759 B1* | 9/2014 | Jackson | H04L 67/02 709/204 |
| 9,286,397 B1* | 3/2016 | Suleman | G06Q 30/0269 |
| 2011/0314084 A1* | 12/2011 | Saretto | H04W 4/21 709/203 |

* cited by examiner

*Primary Examiner* — David R Lazaro
(74) *Attorney, Agent, or Firm* — Fenwick & West LLP

(57) ABSTRACT

An online system generates a feed of content for a user that includes content items provided by, or otherwise related to, other users who are connected to the user via the online system. The online system supplements the feed with additional content items that are not related to users who are connected to the user but are likely to be of interest to the user. The additional content items may be associated with users who are connected to additional users who are connected to the user, content items having received a threshold amount of interacting by other users, content items provided by users who provided other content with which the user interacted, or have other characteristics. The additional content items and content items associated with users connected to the user are included in one or more selection processes that generate the feed for the user.

18 Claims, 3 Drawing Sheets

GENERATING A FEED OF CONTENT FOR A USER OF AN ONLINE SYSTEM INCLUDING CONTENT ASSOCIATED WITH ADDITIONAL ONLINE SYSTEM USERS WHO ARE NOT CONNECTED TO THE USER VIA THE ONLINE SYSTEM

BACKGROUND

This disclosure relates generally to recommending content to online system users, and more specifically to identifying content items or users for presentation to an online system user.

An online system allows its users to connect to and communicate with other online system users. For example, an online system allows a user to maintain content items, such as images or video data, and present the content items to other online system users. An online system user may establish a connection to other users, prompting the online system to present content items received from the other user to the user, encouraging interaction between various users.

However, many conventional online systems merely present a content item received from a user to other users connected to the user. However, merely presenting content received from other users connected to the user may limit the content presented to the user, reducing the user's interaction with content provided by the online system. However, presenting content provided to the online system by users who are not connected to the vowing user may result in a user being presented with content items in which the user has minimal interest. If an online system presents the user with content items in which the user is uninterested, the user may decrease interaction with the online system.

SUMMARY

An online system retrieves information describing one or more attributes of an online system user. Examples of attributes associated with the user include demographic information, actions associated with the user, connections between the user and additional users, interests of the user or other suitable information describing the user. The online system may retrieve the attributes of the user from a user profile maintained by the online system for the user, as well as other information maintained by the online system for the user. While the online system generates a feed including various content items associated with other users connected to the user via the online system, the online system supplements the feed with additional content items that are associated with users who are not connected to the user via the online system.

To identify additional content items associated with users who are not connected to the user that are evaluated for inclusion in the feed for the user, the online system retrieves content items having one or more characteristics from a set of characteristics. Example characteristics of a content item include attributes of a user providing the content item to the online system, information describing additional online system users who interacted with the content item, interactions with the content item by users of the online system, one or more interests associated with the content item, temporal information associated with the content item or associated with a user associated with the content item, or any other suitable information associated with a content item. As content items may have various characteristics, the online system may use any suitable characteristic or combination of characteristics to identify the additional content items.

For example, the online system identifies additional content items as content items associated with another user who is connected to an additional user who is connected to the user. As another example, the online system identifies additional content items as content items associated with an interest of the user. When identifying additional content items associated with an interest of the user, the online system may identify the interest of the user, identify content items associated with the interest, and determine a score for each identified content item associated with the interest; a score for an identified content item associated with the interest is based on one or more of: a length of time the identified content item has been presented to users by the online system, an amount of interaction by online system users to whom the identified content item was presented, and a number of users who established a connection to the identified content item. Identified content items having at least a threshold position in the ranking are selected by the online system as additional content items. In another example, the online system identifies content items associated with an interest of the user and selects additional content items as identified content items based on amounts of user interaction with the identified content items (e.g., identified content items having at least a threshold amount of user interaction, identified content items having at least a threshold position in a ranking based on amounts of user interaction). As another example, the online system identifies additional content items as content items associated with an interest of the user that were provided to the online system by another user who provided content items to the online system that received at least a threshold amount of user interaction when presented to users by the online system. In a further example, the online system identifies additional content items as content items provided by an additional user who provided other content to the online system that the user previously viewed.

The online system includes the identified additional content items and content items associated with other users to whom the user is connected in one or more selection processes that select content for presentation to the user. In various embodiments, the one or more selection processes determine measures of relevance for each of the additional content items and for each of the content items. A measure of relevance represents the user's likely interest in a content item or in an additional content item. Based on the measures of relevance, the one or more selection processes select content from the additional content items and the content items and generates a feed including the selected content for presentation to the user. For example, a selection process ranks the content items and the additional content items based on their measures of relevance and selects content items or additional content items having at least a threshold position in the ranking for inclusion in the feed. In some embodiments, the online system maintains a maximum number of additional content items included in a feed to regulate an amount of content items. Additionally or alternatively, the online system may include additional content items selected by the one or more selection processes in specific positions in the feed of content to regulate where the additional content items are presented in the feed relative to selected content items associated with other users connected to the user. The online system provides the generated feed to a client device associated with the user for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
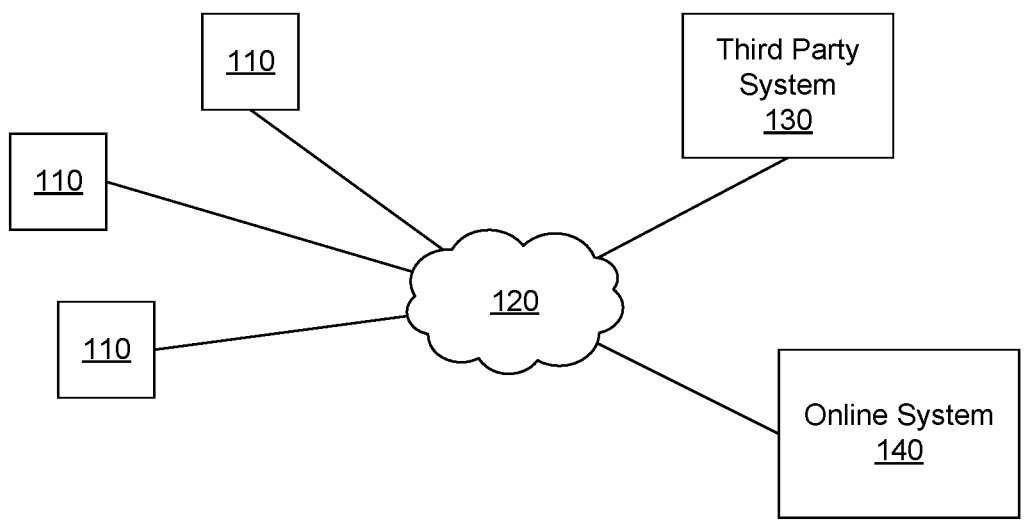
FIG. 1 is a block diagram of a system environment in which a social networking system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
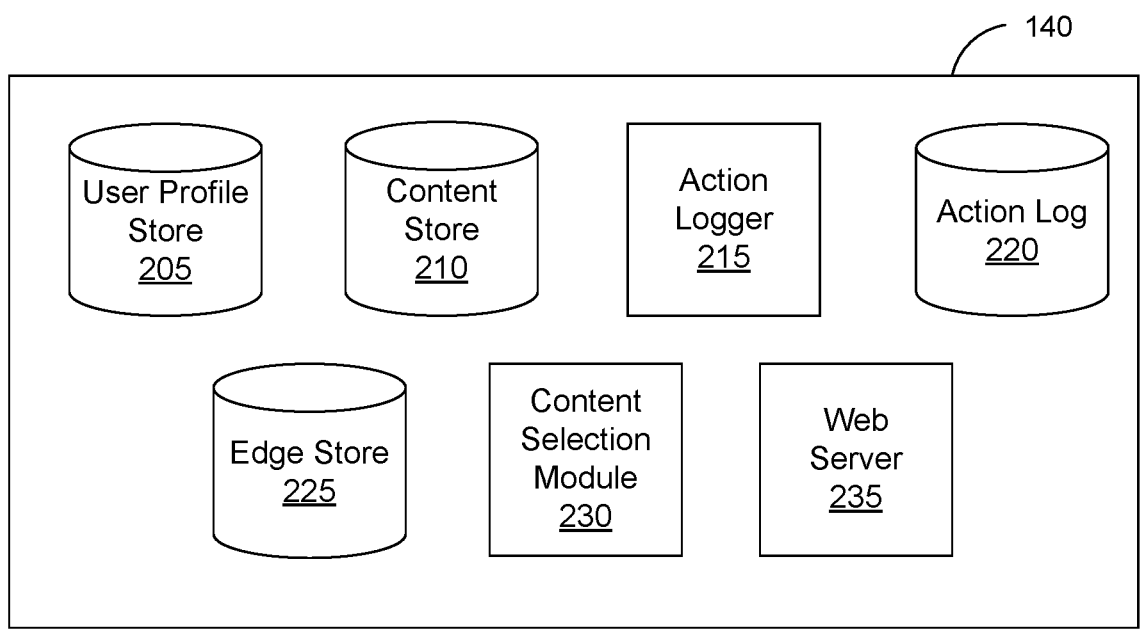
FIG. 2 is a block diagram of a social networking system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. The connections between users and other objects, or edges, can be uni-directional (e.g., a user following another user) or bi-directional (e.g., a user is a friend with another user).

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on attributes associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. The content selection module 230 may also determine the order in which selected content items are presented via the feed. For example, the content selection module 230 orders content items in the feed based on likelihoods of the user interacting with various content items.

In various embodiments, the content selection module 230 includes one or more additional content items that are not associated with other users connected to the user in the feed of content for the user. Including content items in a feed of content that are not associated with users connected to the user allows the content selection module 230 to present the user with a broader range of content items or to interact with a greater variety of users, increasing the amount of interaction between the user and the online system 140. To identify additional content items that are not associated with users connected to the user, the content selection module 230 identifies attributes of a user based on a user profile in the user profile store 205 corresponding to the user, as well as information associated with the user and included in the action log 220 and in the edge store 225. Examples of attributes associated with a user include demographic information (e.g., age, location, gender, etc.), actions (e.g., check-ins, reactions to presented content items), connections between the user and other users or content items, or other suitable information as described further in FIG. 3. Additionally, the content selection module 230 retrieves content items from the content store 210 that have one or more characteristics from a set of characteristics. Example characteristics of a content item include attributes of a user providing the content item to the online system, information describing additional online system users who interacted with the content item, interactions with the content item by users of the online system, one or more interests associated with the content item, temporal information associated with the content item or associated with a user associated with the content item, or any other suitable information associated with a content item. Hence, as further described below in conjunction with FIG. 3, the content selection module 230 may identify the additional content items based on characteristics of content items, attributes of the user, on attributes of a variety of social networking system users, or a combination of user-specific and global user attributes. As further described below in conjunction with FIG. 3, the content selection module 230 includes the additional content items, in addition to content items associated with other users connected to the user, in the one or more selection processes that select content for inclusion in the feed presented to the user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
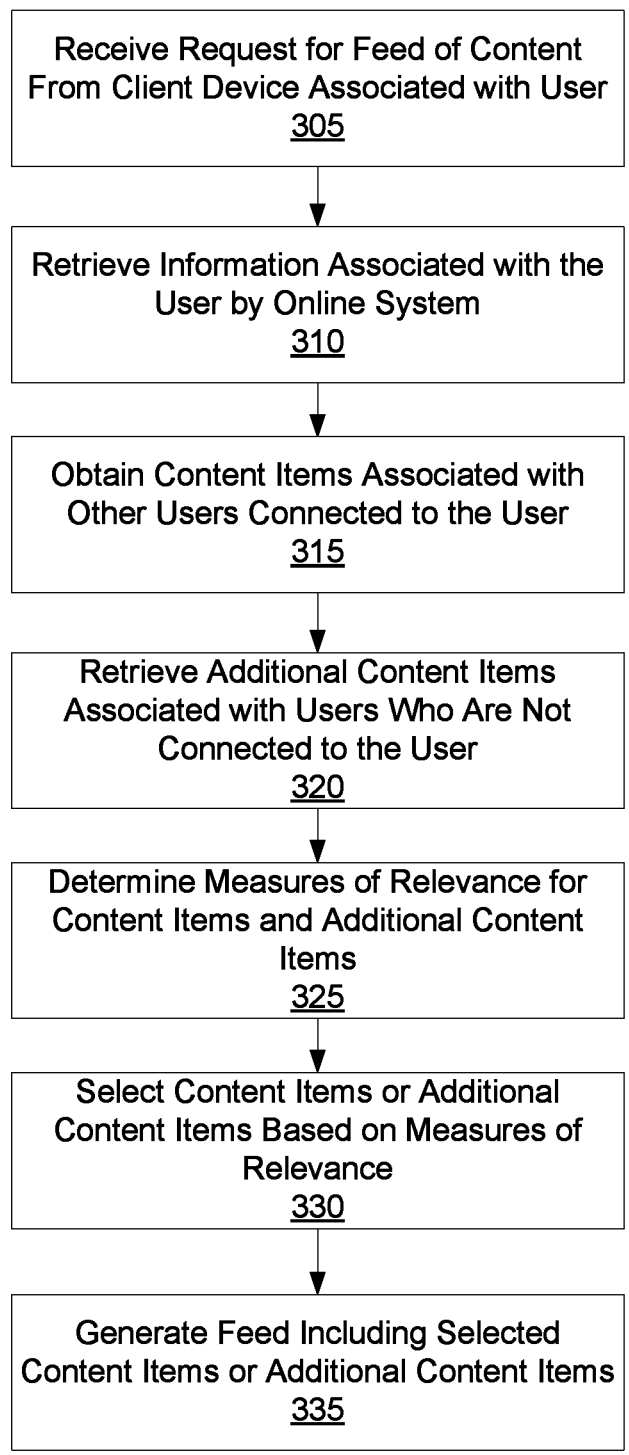
FIG. 3 is a flowchart of a method for selecting content items for presentation to an online system user based on content item characteristics, in accordance with an embodiment.

Selecting Content Items Based on Characteristics of Content Items and Attributes of a User FIG. 3 is a flowchart of one embodiment of a method for selecting content items for presentation to an online system user based on characteristics of the content items. In various embodiments, the steps described in conjunction with FIG. 3 may be performed in different orders. Additionally, in some embodiments, the method may include different and/or additional steps than those shown in FIG. 3.

The online system 140 receives 305 a request for a feed of content from a client device associated with a user and retrieves 310 information associated with the user of the online system 140. For example, the online system 140 retrieves 310 information in a user profile associated with the user, actions associated with the user, or connections between the user and additional online system users. In some embodiments, the information may be retrieved from an additional online system or other third party system 130 maintaining information about the user and that the user authorizes the online system 140 to access. The request for the feed of content may specify an interest (or a "topic") of the user, so content items included in the feed of content are associated with the specified interest. Hence, if the request identifies an interest, the subsequent content evaluated for inclusion in the feed is limited to content that is associated with the identified interest.

Various types of information associated with the user may be retrieved 310. For example, user-specific attributes describe demographic characteristics associated with the user (e.g., location, age, gender, education history, etc.), other users connected to the user via the online system 140 or via a third party system 130, and may also describe demographic characteristics of users connected to the user via the online system 140. Interaction-specific attributes, which describe the user's interaction with content items or other online system users may be retrieved 310. Examples of interaction-specific attributes include comments provided by a user for a content item associated with another user, content items in which the user expressed a preference (i.e., content items the user "liked"), content items to which the user indicated a reaction to the online system 140, content items shared with other users by the user (including a number of times the user shared the content item), connections to other users or objects established by the user, a location associated with an interaction performed by the user, or other suitable information. Additionally, time-based attributes associated with the user may be retrieved 310. A time-based attribute provides contextual information associated with a user interaction. Examples of time-based attributes include type of device used by the user to interact with a content item, a time when the user interacted with a content item or other suitable information.

To generate the feed of content for the user, the online system 140 obtains 315 content items maintained by the online system 140 (or otherwise accessible to the online system 140) and associated with other users who are connected to the user via the online system 140. For example, based on the retrieved information associated with the user, the online system 140 identifies other users who are connected to the user via the online system 140 and obtains 315 content provided to the online system 140 by the other users within a threshold amount of time from a time when the online system 140 received 305 the request for the feed of content. Additionally, the online system 140 may identify actions performed by the other users connected to the user and identified to the online system 140 within the threshold amount of time from the time when the online system 140 received 305 the request for the feed of content and generate content items that each describe an identified action and anther user who performed the action.

The online system 140 supplements the obtained content items associated with other users connected to the user by retrieving 320 additional content items associated with users who are not connected to the user via the online system 140 and that have one or more characteristics from a set of characteristics. A characteristic of a content item is information describing the content item, and a content item may be associated with multiple characteristics. Characteristics of a content item include characteristics of a user associated with the content item, such as a user who provided the content item to the online system 140. Example characteristics of a content item include attributes of a user providing the content item to the online system 140, information describing additional online system users who interacted with the content item, interactions with the content item by users of the online system 140, one or more interests associated with the content item, temporal information associated with the content item or associated with a user associated with the content item, or any other suitable information associated with a content item. Temporal characteristics of a content item include a location associated with the content item, a date and/or time associated with the content item, a location associated with one or more users associated with the content item, a type of client device 110 used to provide the content item to the online system 140, a type of client device 110 associated with interactions with the content item, a time when a threshold number of users interacted with the content item, or any other suitable information describing interaction with the content item. For example, a location associated with a content item is a geographic location where the content item was generated (e.g., a location where a picture was captured), a geographic location where a user interacted with the content item, or a geographic location associated with a content within the content item. A location associated with a user may be a geographic location from which the user currently interacts with the online system 140, a geographic location associated with the user in a user profile, a geographic location from which the user interacted with a content item, or any other suitable geographic location.

In various embodiments, the online system 140 retrieves 320 additional content items having characteristics satisfying one or more criteria. For example, the online system 140 identifies additional content items as content items associated with another user who is connected to an additional user who is connected to the user. As another example, the online system 140 retrieves 320 additional content items associated with an interest of the user and provided to the online system 140 by users who are not connected to the user. When retrieving 320 additional content items associated with an interest of the user, the online system 140 may identify the interest of the user from a user profile maintained for the user by the online system 140, identify content items associated with the interest, and determine a score for each identified content item associated with the interest. A score for an identified content item associated with the interest is based on one or more of: a length of time the identified content item has been presented to users by the online system 140, an amount of interaction by online system users to whom the identified content item was presented, and a number of users who established a connection to the identified content item. The online system 140 may rank identified content items based on their scores and retrieve 320 identified content items having at least a threshold position in the ranking as additional content items by the online system 140; alternatively, the online system 140 retrieves 320 identified content items having at least a threshold score as additional content items. In another example, the online system 140 identifies content items associated with an interest of the user (e.g., associated with an interest included in a user profile maintained for the user) provided to the online system 140 by users who are not connected to the user and retrieves 320 additional content items from the identified content items based on amounts of user interaction with the identified content items; the online system 140 may retrieve 320 additional content items as identified content items having at least a threshold amount of user interaction or may retrieve 320 additional content items as identified content items having at least a threshold position in a ranking based on amounts of user interaction. When retrieving 320 additional content items based on amounts of user interaction with identified content items, the online system 140 may account for amounts of one or more particular interaction by users with identified content items or may account for overall interactions by users with identified content items.

As another example, the online system 140 retrieves 320 additional content items as content items that are associated with an interest of the user and that were provided to the online system 140 by another user who provided content items to the online system 140 that received at least a threshold amount of user interaction when presented. The amount of user interaction with the content item provided by the other user may be based on occurrences of one or more particular interactions by users with content items provided to the online system 140 by the other user or may be based on occurrences of various interactions by users by with content items provided to the online system 140 by the other user. In some embodiments, the online system 140 determines the amount of interaction within a specific time interval (e.g., within a threshold time from a time when the request for the feed of content was received 305) by users with content items provided to the online system 140 by the other user. In a further example, the online system 140 retrieves 320 additional content items as content items provided by an additional user who provided other content to the online system 140 that the user previously viewed or with which the user performed one or more interactions. As another example, the online system 140 retrieves 320 additional content items provided to the online system 140 by one or more users who are not connected to the user and who provide content items to the online system 140 with at least a threshold frequency or rate.

In other embodiments, the online system 140 identifies various clusters of users based on connections between the users, so a cluster of users having at least a threshold number of connections to other users in the cluster. For various clusters, the online system 140 obtains content items provided to the online system 140 by users in a cluster (or otherwise associated with users in a cluster) associated with an interest of the user, which the online system 140 determines from the user profile maintained for the user. The online system 140 determines a score for obtained content items associated with the interest of the user in a cluster based on interaction by other users with the obtained content items, and retrieves 320 additional content items from one or more clusters based on the scores (e.g., a score for a content item is directly related to the amount of interaction with the content item, so content items with higher score received more user interaction). For example, the online system 140 ranks content items obtained from a cluster based on their scores and retrieves 320 content items having at least a threshold position in the ranking as additional content items. Alternatively, the online system 140 retrieves 320 content items obtained from a cluster having at least a threshold score as additional content items. In some embodiments, the online system 140 retrieves 320 additional content items from at least a threshold number of clusters (or from less than the threshold number of clusters).

Alternatively or additionally, the online system 140 identifies groups associated with an interest of the user by identifying other users having identified the interest and selects groups having at least a threshold number or a threshold percentage of the other users who identified the interest. The online system 140 retrieves 320 content items provided to one or more selected groups as additional content items. For example, the online system 140 retrieves 320 content items provided to a selected group within a threshold amount of time from a time when the online system 140 receives 305 the request for the feed of content as additional content items. Similarly, the online system 140 identifies pages of content associated with an interest of the user by identifying other users having identified the interest and selects pages with which least a threshold number or a threshold percentage of the other users who identified the interest have interacted or have established a connection. The online system 140 retrieves 320 content items provided to one or more selected pages as additional content items. For example, the online system 140 retrieves 320 content items provided to a selected page within a threshold amount of time from a time when the online system 140 receives 305 the request for the feed of content as additional content items.

In some embodiments, the online system 140 identifies one or more other users who provided content items to the online system 140 with which the user interacted but who are not connected to the user. For a specified time interval after the user interacted with a content item provided to the online system 140 by another user who is not connected to the user, the online system 140 retrieves 320 content items provided to the online system 140 by the other user during the specified time interval as additional content items. After the specified time interval lapses, the online system 140 ceases retrieving 320 content items provided to the online system 140 by the other user as additional content items. The online system 140 may also limit retrieval 320 of content items provided to the online system 140 by the other user who is not connected to the user to a specified time interval after the user interacts with a content item provided to the online system 140 by the other user that is associated with an interest of the user.

As another example, the online system 140 represents the user and other users of the online system 140 as a vector in a vector space. Based on vectors corresponding to the user and to additional users who are not connected to the user, the online system 140 selects a set of additional users and retrieves 320 content items associated with additional users of the selected set (e.g., content items provided to the online system 140 by additional users of the selected set) as additional content items. For example, the set of additional users includes users who are not connected to the user and who correspond to vectors having less than a threshold Euclidean distance to the vector corresponding to the user.

The online system 140 includes the retrieved additional content items and the content items associated with other users to whom the user is connected in one or more selection processes that select content for presentation to the user. In various embodiments, the one or more selection processes determine 325 measures of relevance for each of the additional content items and for each of the content items associated with other users connected to the user. A measure of relevance represents the user's likely interest in a content item or in an additional content item. Based on the measures of relevance, the one or more selection processes select 330 content from the additional content items and the content items and generates 335 the feed of content, which includes at least one selected additional content item, for presentation to the user. For example, a selection process ranks the content items and the additional content items based on their measures of relevance and selects 330 content items or additional content items having at least a threshold position in the ranking for inclusion in the feed. Alternatively, a selection process selects 330 content items or additional content items having at least a threshold measure of relevance for inclusion in the feed. The online system 140 communicates the generated feed to a client device 110 associated with the user for presentation to the user.

In some embodiments, the online system 140 maintains a maximum number of additional content items included in a feed to regulate an amount of content items. Hence, if greater than the maximum number of additional content items are selected 330 for inclusion in the feed, the online system 140 selects 330 alternative content items associated with users connected to the user for inclusion in the feed in place of an amount of additional content items exceeding the maximum number of additional content item. For example, the online system 140 selects content items associated with users connected to the user that were not initially selected 335 for inclusion in the feed to replace additional content items exceeding the maximum number of additional content items having lowest measures of relevance among the initially selected 330 additional content items. Additionally or alternatively, the online system 140 may include additional content items selected by the one or more selection processes in specific positions in the feed of content to regulate where the additional content items are presented in the feed relative to selected content items associated with other users connected to the user. For example, the online system 140 specifies a minimum number of content items associated with users connected to the user that are presented in the feed prior to presentation of an additional content item in the feed.

Figure 4:
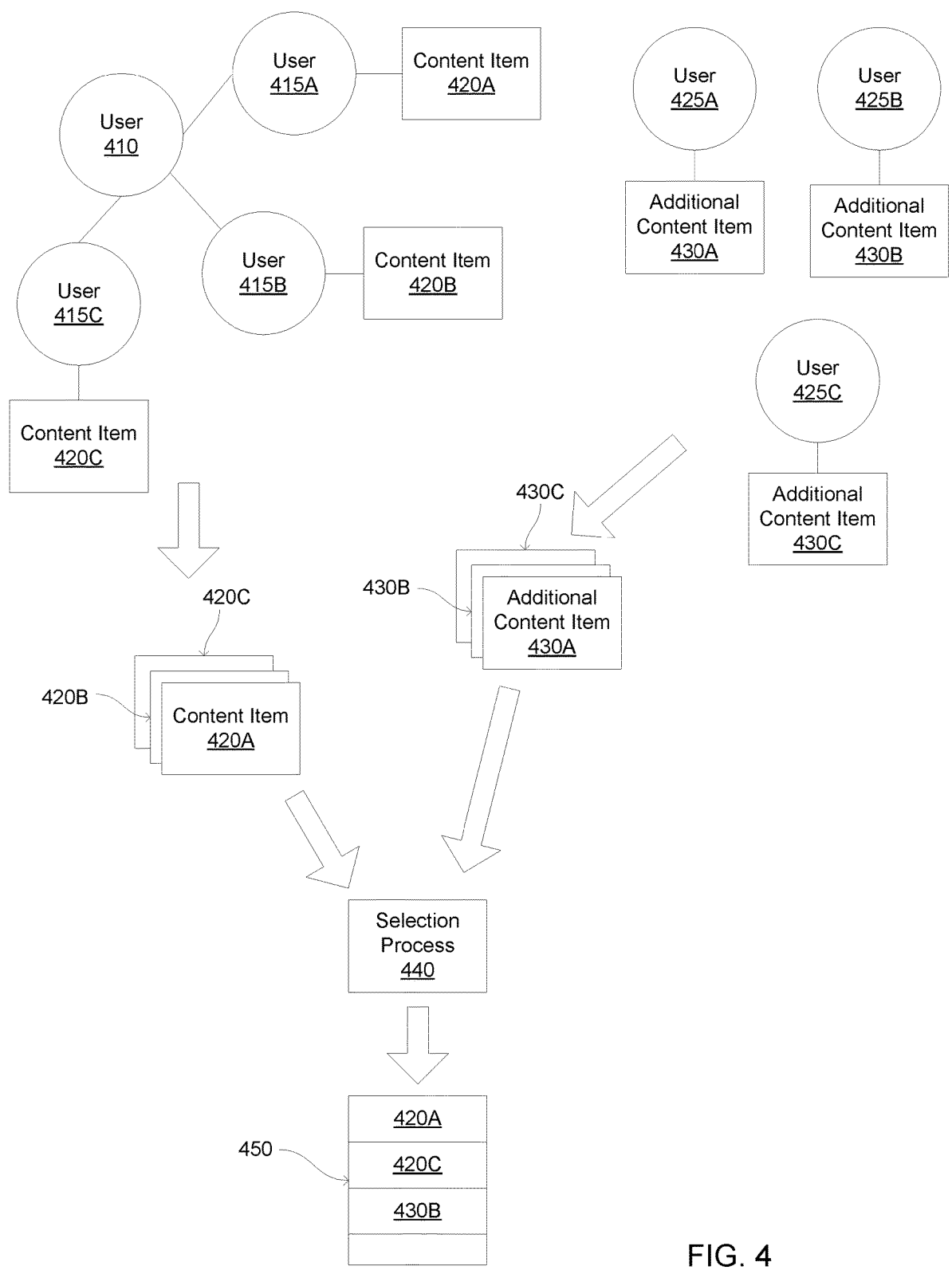
FIG. 4 is a process flow diagram of generation of a feed of content for a user of an online system that includes content items associated with other users connected to the user and additional content items provided to the online system by users who are not connected to the user, in accordance with an embodiment.

FIG. 4 is a process flow diagram of generation of a feed of content for a user of an online system that includes content items associated with other users connected to the user and additional content items provided to the online system by users who are not connected to the user. In the example of FIG. 4, the user 410 is connected to users 415A, 415B, 415C via an online system 140, while the user 410 is not connected to users 425A, 425B, 425C via the online system 140. Users 415A, 415B, 415C are associated with content items 420A, 420B, 420C, respectively. For example users 415A, 415B, 415C provided content items 420A, 420B, 420C, respectively, to the online system 140. Similarly, users 425A, 425B, 425C are associated with additional content items 430A, 430B, 430C, respectively.

When the online system 140 receives a request for a feed of content to present to user 410, the online system 140 obtains content items 420A, 420B, 420C, which are associated with users 415A, 415B, 415C who are connected to the user 410. As further described above in conjunction with FIG. 3, the online system 140 also retrieves additional content items provided by users 425A, 425B, 425C who are not connected to the user 410 and that have one or more characteristics. Example characteristics for retrieving additional content items are further described above in conjunction with FIG. 3. For purposes of illustration, each of additional content items 430A, 430B, 430C have one or more characteristics causing their retrieval by the online system 140.

The online system 140 includes the content items 420A, 420B, 420C that are associated with users 415A, 415B, 415C who are connected to the user 410 and the retrieved additional content items 430A, 430B, 430C that are associated with users 425A, 425B, 425C who are not connected to the user 410 in a selection process 440. As further described above in conjunction with FIGS. 2 and 3, the selection process 440 determines measures of relevance for content items 420A, 420B, 420C and for additional content items 430A, 430B, 430C. Based on the measures of relevance, the selection process 440 generates a feed 450 including content for the user 410. In the example of FIG. 4, the feed 450 includes content items 420A and 420C, as well as additional content item 430B. As the feed 450 includes additional content item 430B, which is associated with user 425B who is not connected to the use 410, the feed 450 presents the user 410 with a broader range of content to increase interaction by the user 410 with the online system 140.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a request for a feed of content for presentation to a user of an online system from a client device associated with the user;
   retrieving information associated with a user of an online system, the information maintained by the online system;
   obtaining one or more content items maintained by the online system associated with one or more other users connected to the user via the online system, the one or more other users having a bi-directional connection to the user via the online system;
   retrieving additional content items associated with users who are not connected to the user via the online system and having one or more characteristics from a set of characteristics by:
      identifying an interest of the user from the retrieved information associated with the user; and
      retrieving content items associated with the identified interest by:
         identifying content items provided to the online system by users who are not connected to the user;
         determining a score for each identified content item based on a length of time that an identified content item has been presented to users by the online system; and
         retrieving identified content items as the additional content items based on the scores;
   determining measures of relevance for each of the retrieved additional content items and for one or more content items associated with the one or more other users connected to the user via the online system based on characteristics of the additional content items and the one or more content items associated with the one or more other users connected to the user via the online system as well as the retrieved information associated with the user;
   generating the feed of content for presentation to the user based on the determined measures of relevance, the feed of content including at least one of the additional content items; and
   communicating the feed of content including at least one or the retrieved content items to a client device for presentation to the user.

2. The method of claim 1, wherein the retrieved information associated with the user includes information describing one or more selected from a group consisting of: demographic information associated with the user, connections between the user and one or more other users of the social networking system, interactions between the user and one or more content items, demographic information associated with users connected to the user by the social networking system, and any combination thereof.

3. The method of claim 1, wherein retrieving additional content items associated with users who are not connected to the user via the online system and having one or more characteristics from a set of characteristics further comprises:
   retrieving content items associated with another user connected to an additional user who is connected to the user.

4. The method of claim 1, wherein determining the score for each identified content item is further based on one or more of:
   an amount of interaction by online system users to whom the identified content item was presented, a number of users who established a connection to the identified content item, and any combination thereof.

5. The method of claim 1, wherein retrieving identified content items as the additional content items based on the scores comprises:
   ranking the identified content items based on the scores; and
   selecting identified content items having at least a threshold position in the ranking as the additional content items.

6. The method of claim 1, wherein retrieving content items associated with the identified interest further comprises:
   identifying content items provided to the online system by users who are not connected to the user that are associated with the identified interest;
   determining amounts of interaction by users of the online system with each of the identified content items; and
   retrieving identified content items having at least a threshold amount of interaction by users of the online system as additional content items.

7. The method of claim 1, wherein retrieving content items associated with the identified interest further comprises:
   identifying content items provided to the online system by users who are not connected to the user that are associated with the identified interest;
   determining amounts of interaction by users of the online system with each of the identified content items;
   ranking the identified content items based on the determined amounts of interaction by users of the online system; and
   retrieving identified content items having at least a threshold position in the ranking as additional content items.

8. The method of claim 1, wherein retrieving content items associated with the identified interest further comprises:
retrieving content items associated with the identified interest that were provided to the online system by another user who provided content items to the online system that received at least a threshold amount of interaction from user.

9. The method of claim 1, wherein retrieving additional content items associated with users who are not connected to the user via the online system and having one or more characteristics from a set of characteristics further comprises:
retrieving content items provided to the online system by an additional user who provided other content to the online system with which the user previously interacted.

10. The method of claim 1, wherein retrieving additional content items associated with users who are not connected to the user via the online system and having one or more characteristics from a set of characteristics further comprises:
retrieving content items provided to the online system by one or more users who are not connected to the user and who provide content items to the online system with at least a threshold frequency.

11. The method of claim 1, wherein retrieving additional content items associated with users who are not connected to the user via the online system and having one or more characteristics from a set of characteristics further comprises:
identifying another user who is not connected to the user and who provided a content item to the online system with which the user interacted; and
retrieving additional content items provided to the online system by the identified other user during a specified time interval.

12. The method of claim 1, wherein retrieving additional content items associated with users who are not connected to the user via the online system and having one or more characteristics from a set of characteristics further comprises:
identifying groups of users maintained by the online system having at least a threshold amount of users who identified an interest of the user determined form the retrieved information associated with the user; and
retrieving content items provided to the identified groups as additional content items.

13. A computer program product comprising a non-transitory computer readable medium having instructions encoded thereon that, when executed by a processor, cause the processor to:
receive a request for a feed of content for presentation to a user of an online system from a client device associated with the user;
retrieve information associated with a user of an online system, the information maintained by the online system;
obtain one or more content items maintained by the online system associated with one or more other users connected to the user via the online system, the one or more other users having a bi-directional connection to the user via the online system;
retrieve additional content items associated with users who are not connected to the user via the online system and having one or more characteristics from a set of characteristics by:
identifying an interest of the user from the retrieved information associated with the user; and
retrieving content items associated with the identified interest by:
identifying content items provided to the online system by users who are not connected to the user;
determining a score for each identified content item based on a length of time that an identified content item has been presented to users by the online system; and
retrieving identified content items as the additional content items based on the score;
determine measures of relevance for each of the retrieved additional content items and for one or more content items associated with the one or more other users connected to the user via the online system based on characteristics of the additional content items and the one or more content items associated with the one or more other users connected to the user via the online system as well as the retrieved information associated with the user;
generate the feed of content for presentation to the user based on the determined measures of relevance, the feed of content including at least one of the additional content items; and
communicate the feed of content including at least one or the retrieved content items to a client device for presentation to the user.

14. The computer program product of claim 13, wherein retrieve additional content items associated with users who are not connected to the user via the online system and having one or more characteristics from a set of characteristics further comprises:
retrieve content items associated with another user connected to an additional user who is connected to the user.

15. The computer program product of claim 13, wherein determining the score for each identified content item is further based on one or more of:
an amount of interaction by online system users to whom the identified content item was presented, a number of users who established a connection to the identified content item, and any combination thereof.

16. The computer program product of claim 13, wherein retrieve content items associated with the identified interest further comprises:
identify an interest of the user from the retrieved information associated with the user retrieve content items associated with the identified interest that were provided to the online system by another user who provided content items to the online system that received at least a threshold amount of interaction from user.

17. The computer program product of claim 13, wherein retrieve additional content items associated with users who are not connected to the user via the online system and having one or more characteristics from a set of characteristics further comprises:
retrieve content items provided to the online system by an additional user who provided other content to the online system with which the user previously interacted.

18. The computer program product of claim 13, wherein retrieve additional content items associated with users who are not connected to the user via the online system and having one or more characteristics from a set of characteristics further comprises:

retrieve content items provided to the online system by one or more users who are not connected to the user and who provide content items to the online system with at least a threshold frequency.

* * * * *

UNITED STATES PATENT AND TRADEMARK OFFICE
CERTIFICATE OF CORRECTION

PATENT NO. : 10,484,489 B2
APPLICATION NO. : 15/394722
DATED : November 19, 2019
INVENTOR(S) : Khalid Bakry El-Arini and David Vickrey It is certified that error appears in the above-identified patent and that said Letters Patent is hereby corrected as shown below:

In the Claims

Column 18, Lines 48-49, In Claim 16, before "retrieve", delete "identify an interest of the user from the retrieved information associated with the user"

Signed and Sealed this
Second Day of June, 2020

Andrei Iancu
*Director of the United States Patent and Trademark Office*